(12) United States Patent
Hori

(10) Patent No.: US 11,042,482 B2
(45) Date of Patent: Jun. 22, 2021

(54) CONTENT ENCAPSULATION STRUCTURE, AND CONTENT PROVISION METHOD AND SYSTEM USING SAME

(71) Applicant: Nonprofit Organization Cyber Campus Consortium TIES, Nara (JP)

(72) Inventor: Masumi Hori, Nara (JP)

(73) Assignee: NONPROFIT ORGANIZATION CYBER CAMPUS CONSORTIUM TIES, Nara (JP)

(*) Notice: Subject to any disclaimer, the term of this patent is extended or adjusted under 35 U.S.C. 154(b) by 145 days.

(21) Appl. No.: 16/438,997

(22) Filed: Jun. 12, 2019

(65) Prior Publication Data

US 2019/0294550 A1    Sep. 26, 2019

Related U.S. Application Data

(63) Continuation of application No. PCT/JP2017/043508, filed on Dec. 4, 2017.

(30) Foreign Application Priority Data

Dec. 14, 2016 (JP) .............................. JP2016-242131

(51) Int. Cl.
*G06F 12/0875* (2016.01)
*G06F 13/00* (2006.01)
(Continued)

(52) U.S. Cl.
CPC .......... *G06F 12/0875* (2013.01); *G06F 13/00* (2013.01); *G06Q 50/20* (2013.01);
(Continued)

(58) Field of Classification Search
None
See application file for complete search history.

(56) References Cited

U.S. PATENT DOCUMENTS

| 9,666,087 B2 | 5/2017 | Mayumi et al. |
| 2012/0148999 A1* | 6/2012 | Baker ...................... G09B 7/00 434/362 |

(Continued)

FOREIGN PATENT DOCUMENTS

| JP | 2003-503780 | 1/2003 |
| JP | 2003-85353 | 3/2003 |

(Continued)

OTHER PUBLICATIONS

International Search Report dated Feb. 6, 2018 in International (PCT) Application No. PCT/JP2017/043508.

*Primary Examiner* — Michael Alsip
(74) *Attorney, Agent, or Firm* — Wenderoth, Lind & Ponack, L.L.P.

(57) ABSTRACT

The present invention encapsulates content and provides the encapsulated content to a use. A capsule stores identification information in structure information in a metadata unit thereof, and identification information such as URL and URN is stored therein. A capsule engine unit decodes the identification information. In the case of URL, the capsule engine unit directly obtains the entity of data or programs constituting the content from a server, which is an external storage. In the case of URN, the capsule engine unit inquires URL to a dictionary server such as a metadata repository, and obtains the URL from the server. Therefore, it is not necessary to install the entity of data or programs in a data cache unit, and it is possible to easily deliver and distribute the capsule.

20 Claims, 7 Drawing Sheets

(51) Int. Cl.
*G09B 5/02* (2006.01)
*G06Q 50/20* (2012.01)
*G09B 5/06* (2006.01)
*G09B 5/08* (2006.01)
*G06F 8/60* (2018.01)
*G06F 8/71* (2018.01)
*G06F 9/451* (2018.01)
*G09B 7/00* (2006.01)

(52) U.S. Cl.
CPC ............... *G09B 5/02* (2013.01); *G09B 7/00* (2013.01); *G06F 2212/1041* (2013.01)

(56) References Cited

U.S. PATENT DOCUMENTS

| | | | |
|---|---|---|---|
| 2015/0125843 A1* | 5/2015 | Mayumi | G06F 40/253 434/350 |
| 2016/0148524 A1* | 5/2016 | Pulido | G09B 5/02 434/353 |
| 2016/0275803 A1* | 9/2016 | Martin | G09B 5/06 |
| 2017/0193846 A1* | 7/2017 | Breaux | G06F 16/951 |

FOREIGN PATENT DOCUMENTS

| | | |
|---|---|---|
| JP | 2003-108681 | 4/2003 |
| JP | 2004-212895 | 7/2004 |
| JP | 2006-40038 | 2/2006 |
| JP | 2008-46610 | 2/2008 |
| JP | 2013-7877 | 1/2013 |
| JP | 2015-90452 | 5/2015 |

\* cited by examiner

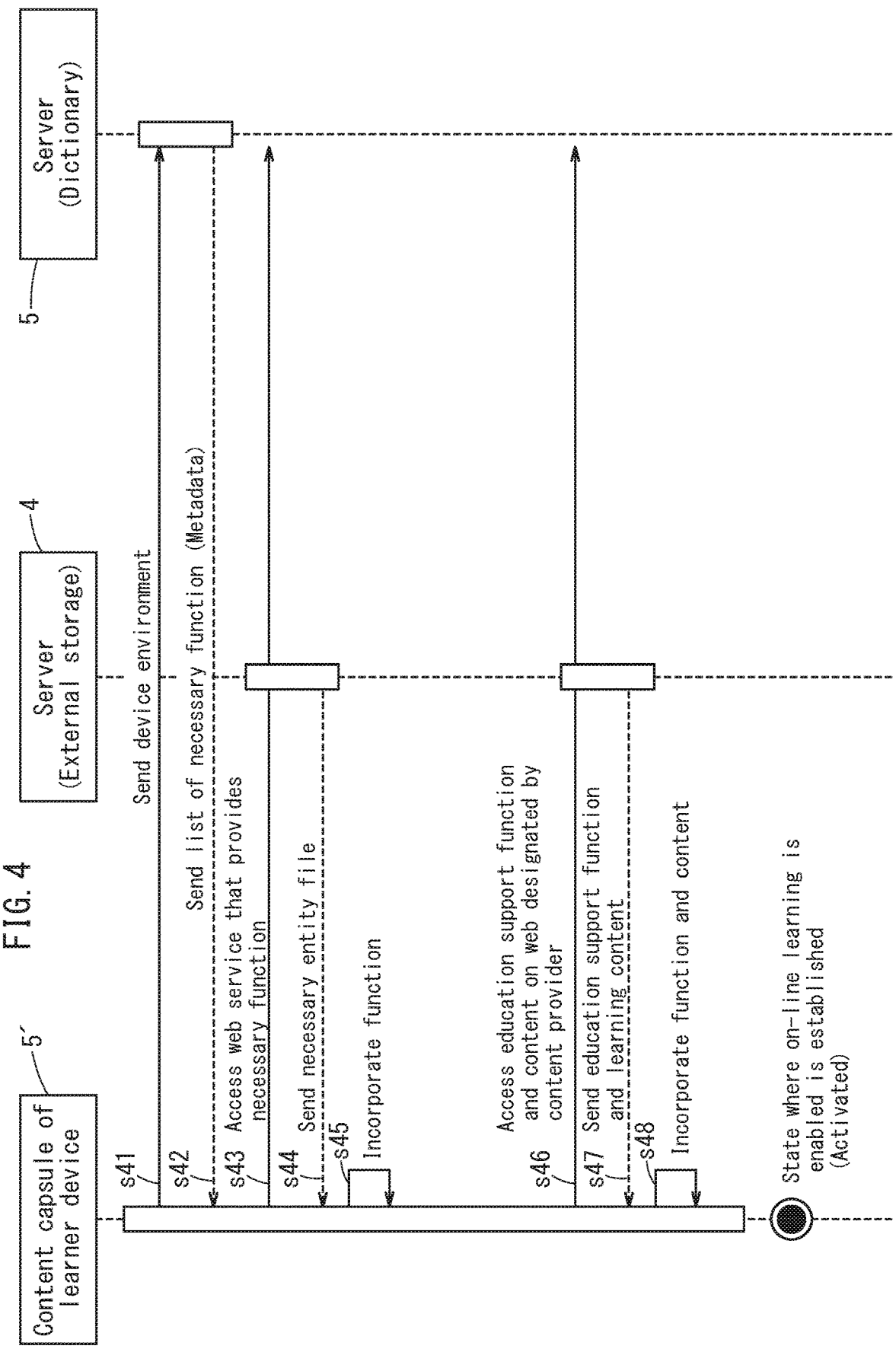

CONTENT ENCAPSULATION STRUCTURE, AND CONTENT PROVISION METHOD AND SYSTEM USING SAME

TECHNICAL FIELD

The present invention relates to a new encapsulation structure which realizes a non-specific-server-based decentralized architecture to be used when content such as data including files and streaming data, scripts and codes, or programs is set in a capsule for delivery and distribution thereof; and also relates to a content provision method and a system which use the same. The encapsulation structure, the content provision method, and the system are those that can be preferably implemented mainly in education, i.e., so-called e-learning, and that can be widely used in e-commerce web services.

BACKGROUND ART

E-learning, i.e., education that is performed on-line by use of the Internet, began in the 1990s, and has been introduced in many schools and companies. On-line education can efficiently provide learning to a large number of people without being constrained by place and time, and is used in various education situations such as school education, education in companies, and lifelong education. Further, in recent years, use of on-line education has been expanded in: for example, on-line education (for example, Non-Patent Literature 1) where several millions of people around the world learn in a large scale across borders; and education in such regions as in developing countries where infrastructures such as school facilities and teachers are not sufficient.

As means for realizing such on-line education, an education support system has been proposed. As seen in Patent Literature 1, in a conventional education support system, a centrally-managed server-client method is mainly employed that provides learning content, education support functions, learning support functions, and the like, through a network to computers of a large number of learners connected to a specific centrally-managed server computer.

The above centrally-managed server-client method has the following problems. That is, (1) the functions provided from a specific system alone cannot provide diverse learning environments that suit individual education providers, and educational learning objectives, approaches, and preferences of learners. (2) Since various functions that support desires of learners, and new functions that are developed in association with development of Internet technology are incorporated one after another, the system gradually becomes complicated and large-scale (Patent Literature 2, 3), which increases the development cost of the system. (3) In each of Patent Literature 4 and Patent Literature 5, there is a proposal of a service provider that can be used at a reasonable price by sharing a costly system, but such a usage does not solve the above-described problem. In addition, since continuous stable operation that provides services to a large number of learners needs to be ensured by a specific server, taking measures for fault tolerance requires high costs. (4) Once a specific system is used, migrating from the system to another system is difficult. (5) As means for solving such problems, attempts to effectively utilize diverse and latest services on the Internet in on-line education without using a specific server have been made (for example, Non-Patent Literature 2). However, there is no proposal of a mechanism that efficiently realizes such a technique, and there is a problem that realization thereof requires substantial IT skills and labor at present.

In contrast to the centrally-managed server-client method as described above, Patent Literature 6 discloses a method in which content and necessary learning support system functions are made into a set and stored in a storage medium such as a USB to be distributed. However, this method does not consider use of resources on the network, thus, making it difficult to update the content or learning support systems that have already been distributed. In addition, when large-capacity content such as a video file is used, the file size may be too large, making it difficult to distribute the content via a network such as the Internet.

CITATION LIST

Patent Literature

[PTL 1] Japanese Translation of PCT International Application No. 2003-503780
[PTL 2] Japanese Unexamined Patent Application Publication No. 2015-90452
[PTL 3] Japanese Unexamined Patent Application Publication No. 2004-212895
[PTL 4] Japanese Unexamined Patent Application Publication No. 2003-108681
[PTL 5] Japanese Unexamined Patent Application Publication No. 2003-85353
[PTL 6] Japanese Unexamined Patent Application Publication No. 2008-46610

Non Patent Literature

Non-Patent Literature 1: MOOCs: Expectations and Reality Full Report http://cbcse.org/wordpress/wp-content/uploads/2014/05/MOOCs#Expectations#and#Reality.pdf
Non-Patent Literature 2: Places to go: Connectivism and connective knowledge. Innovate Online 5(1). Retrieved from https://www.academia.edu/2869475/Places#to#go#Connectivism#and#connective#knowledge

SUMMARY OF THE INVENTION

Problems to be Solved by the Invention

An object of the present invention is to provide, for delivery and distribution of content for circulation: a content encapsulation structure that enhances flexibility and extensibility of a system for delivery and distribution thereof, that accordingly prevents increase in the cost for development and operation maintenance, and that can, especially in the case of on-line education, reduce the burden related to development and the like of a learning support system and allow provision of diverse on-line courses at reasonable prices; and a content provision method and a system using the same.

In the content encapsulation structure, the content provision method, and the system using the same according to the present invention, as described above, in encapsulating the content to enable delivery and distribution thereof, identification information (such as URL and URN) unique to the content such as files and programs are added; the identification information is stored in a metadata unit; and the capsule engine unit refers to the identification information, obtains at least a part of the entity of files and programs of the content corresponding to the identification information from an external storage, and performs a predetermined process.

Therefore, it is not necessary to store all the entity of files and programs within the capsule, and the capsule engine unit refers to the identification information (such as URL and URN), and obtains the entity as appropriate from the external storage. Therefore, the user can easily perform delivery or distribution of the content. Accordingly, in providing various web services such as on-line education and e-commerce, a decentralized architecture that does not require a specific server can be realized. As a result, while the burden related to system development and operation maintenance, and complication of the system are suppressed, services that are excellent in fault tolerance, usability, extensibility, and flexibility can be provided.

BRIEF DESCRIPTION OF THE DRAWINGS

FIG. 4 is a sequence diagram showing a startup operation in an information processing device on the learner side in which a capsule has been incorporated.

DESCRIPTION OF EMBODIMENTS

Embodiment 1

Figure 1:
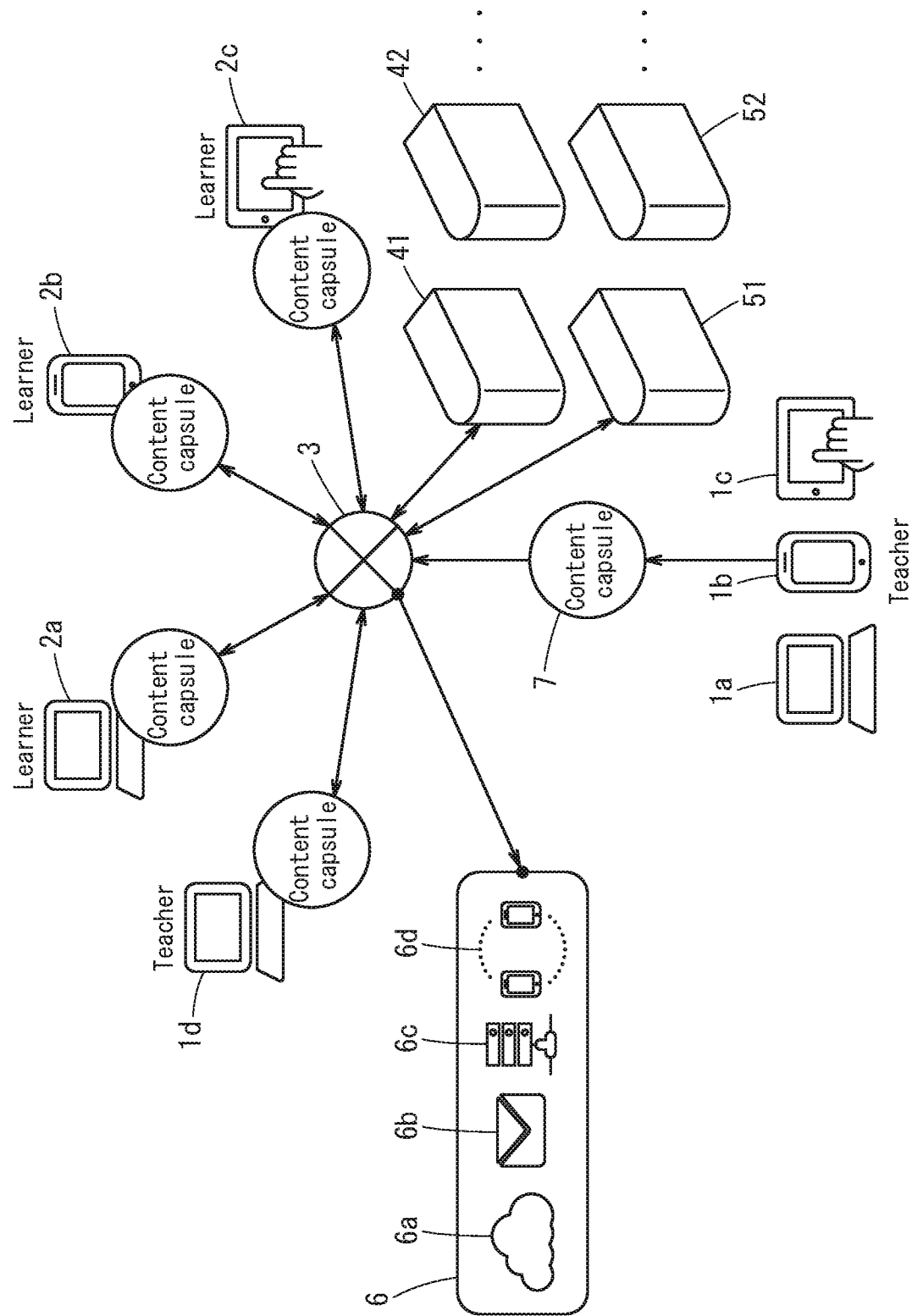
FIG. 1 is a block diagram showing a configuration of a content providing system according to an embodiment of the present invention.

FIG. 1 is a block diagram showing a configuration of a content providing system to which a content encapsulation structure according to an embodiment of the present invention is applied. The present embodiment will be described by exemplifying a learning support system (e-learning system) assuming an on-line course at an educational institution such as a university. However, the present system can be applied to e-commerce systems or the like, as described later, which only has different content to be provided.

The present system for e-learning includes: information processing devices 1a, 1b, 1c, 1d (hereinafter generally referred to by reference numeral 1) on the teacher side, which is the content provider; information processing devices 2a, 2b, 2c (hereinafter generally referred to by reference numeral 2) on the learner side, which is the user; a network 3 which connects the information processing devices 1 and the information processing devices 2; and a large number of servers 41, 42, . . . (hereinafter generally referred to by reference numeral 4) and 51, 52, . . . (hereinafter generally referred to by reference numeral 5), which exist on the network 3.

The information processing device 1 is a creator information processing device which is used by a teacher and which creates encapsulated content (content capsule, hereinafter, referred to as capsule 7). The information processing device 2 is an information processing device which is used by a learner and which obtains a capsule. As the information processing devices 1 and 2 owned by the teacher and the learner, various types of information processing devices such as personal computers, tablet terminals, and smartphones are conceivable. Although a large number of information processing devices 1 and 2 exist, only some of them are shown in FIG. 1 in order to simplify the drawing.

The server 4 has previously stored therein data and programs which serve as desired content. The server 4 serves as an external storage that allows, upon receiving designation of later-described identification information (such as URL and URN), such data and programs to be loaded into the information processing device 2. Examples of the data include files of images and sound, and streaming data. Examples of the programs include scripts and codes indicating a data processing method, and applications.

The server 5 is realized by a metadata repository or the like. In response to an inquiry about identification information (such as URI and URN) from the information processing device 2 described later, the server 5 works as a data dictionary which answers the identification information (such as URL and URN) of the location in an external storage which stores therein data and programs of the content corresponding to the identification information (such as URI and URN). A large number of servers 4 and 5 also exist on the network 3.

The network 3 mutually connects the information processing devices 1, 2 and the servers 4, 5, and is configured by combining (mixing) wired and wireless networks as appropriate. On the network 3, when the information processing device 1 on the teacher side is used as the primary delivery means, delivery means 6 is provided as the secondary delivery means. The delivery means 6 is implemented by various network relay means (nodes) such as a cloud environment (Web) 6a, an e-mail 6b, an on-campus server 6c, and a mobile ad-hoc communication 6d. The delivery means 6 is a collective term thereof.

The entity of various data and programs is stored in advance in each server 4 serving as an external storage and is updated as appropriate. The entity data is mainly static content resources such as video files, image files, and text files. The entity program is mainly dynamic programs and the like including scripts and codes such as video playing software, e-book browsing software, live broadcasting, TV conferencing, chat function, and billing function, and is a data processing method necessary for realizing displaying and desired functions on the data. Meanwhile, the server 5 serving as a data dictionary is realized by a repository server or the like that stores therein software version, OS correspondence, and identification information (such as URL and URN) of the location in the server 4 where the entity thereof is stored.

In the present e-learning system, as described later, the teacher sets (encapsulates) one or a plurality of data or programs as content into one capsule 7 in the information processing device 1 and delivers the capsule 7, via an arbitrary node such as the afore-mentioned cloud environment (Web) 6a, e-mail 6b, on-campus server 6c, or mobile ad-hoc communication 6d. When the learner has received the delivered capsule 7, the capsule 7 is incorporated into the information processing device 2 of the learner. When the capsule 7 has been incorporated into the information processing device 2 on the learner side, as described later in detail, the capsule 7 is activated in accordance with the IT environment and the learning history of each learner, and as learning progresses, the content is personalized by, for example, the capsule 7 being exchanged by learners. The incorporation and exchange of the capsule 7 can be performed in the following ways: in a cloud environment as indicated by reference numeral 6*a*; by e-mail attachment as indicated by reference numeral 6*b*; by distribution from a web server as indicated by reference numeral 6*c*; by direct communication between the information processing devices 2 of learners as indicated by reference numeral 6*d*; or the like.

Figure 2:
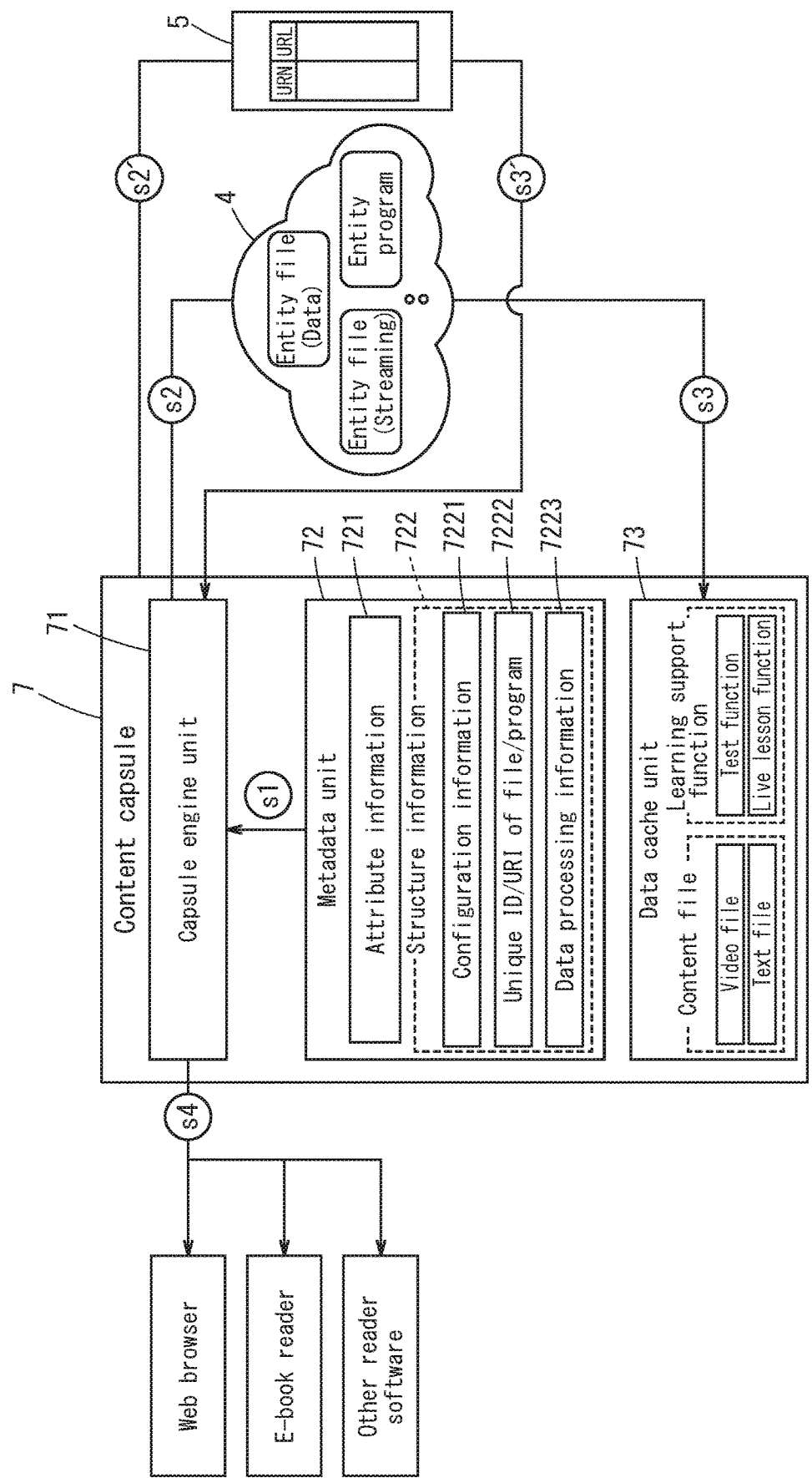
FIG. 2 is a diagram showing a structure example of encapsulated content and a procedure of customizing an information processing device on a learner side in which a capsule has been incorporated, according to one embodiment of the present invention.

FIG. 2 shows a configuration example of the capsule 7 of the present embodiment and the procedure of customization thereof. The capsule 7 of the present embodiment at least includes a capsule engine unit 71 and a metadata unit 72. As a basic function of the capsule engine unit 71, appropriate processing such as displaying is performed on content such as data and programs.

The metadata unit 72 describes information regarding the capsule 7, and generally includes attribute information 721 and structure information 722. The attribute information 721 is information indicating characteristics such as the name (title), the creator name, and the creation date and time of each content file or each program.

The structure information 722 indicates information such as data, programs, and the display order which the content capsule creator wishes to provide to the user, and is composed of configuration information 7221, identification information 7222, data processing information 7223, and the like. The configuration information 7221, as described later, is a list of information of data to be actually displayed and programs (such as scripts and codes, or applications) used for the display. The identification information 7222 is an address indicating the location of the entity file such as URL of the data or program included in the configuration information 7221, or an ID (unique ID) which uniquely indicates a file or a program, such as URN defined in RFC 2396 or a digital object identifier (DOI) determined by the American Publishing Association. In the present specification, these are collectively referred to as identification information. The data processing information 7223 is information indicating the display order and the layout when there are a plurality of resources.

It should be noted that, in the present embodiment, the metadata unit 72 of the capsule 7 does not store the entity of the data or programs itself, but stores the identification information (such as URL, URN, and URI) 7222 of at least a part of the data such as video files, image files, and text files and the programs (such as scripts and codes, or applications), and the capsule engine unit 71 decodes the identification information 7222 and obtains the entity from the server 4 and 5 when necessary.

As shown in step s1 in FIG. 2, when the capsule engine unit 71 has decoded the identification information (such as URL, URN, and URI) 7222 and the identification information 7222 indicates the location, such as URL, of an entity file (resource such as data and streaming data) or an entity program (such as scripts and codes, or application), the capsule engine unit 71 accesses the server 4, which is the external storage, as shown in step s2, loads the entity of the desired data or program into the storage area of the information processing device 2 as shown in step s3, and further installs the entity when necessary.

Meanwhile, when the identification information 7222 is a unique ID such as URI or URN, the capsule engine unit 71, first, as shown in step s2', temporarily accesses (makes inquiry to) the address table of the server 5 serving as the dictionary, and then, as shown in step s3', obtains the storage location such as URL of the target data or program (i.e., searches for the location of the entity of the data or program). Next, the capsule engine unit 71 accesses a corresponding server 4 as shown in the aforementioned step s2, and loads and installs the entity of the desired data or program as shown in the aforementioned step s3.

Now, the inquiry to the server 5 is described in detail. First, the capsule engine unit 71 transmits, to the server 5, environmental information of the information processing device 2 having loaded therein the capsule 7, such as the type of the information processing device 2, the type of the operating system, the type of a browser or a reader with which the capsule 7 is to be displayed, and the state of the communication environment; and the unique ID such as URN of the data or program (s2'). Next, the server 5 determines the version of the data or program corresponding to the environmental information that has been transmitted, and returns the entity file itself of the data or program, or the location (URL) of a program that has a function of realizing the loading thereof (s3'). Subsequently, the capsule engine unit 71 obtains from the server 4 the data or program indicated by the location (URL) returned from the server 5.

The capsule engine unit 71 uses as appropriate the OS, application programs, and the like stored in advance in the device, and subjects the data, of the content autonomously collected as described above, to specified processes such as displaying, and causes the program of the autonomously collected content to realize the function thereof. Specifically, for example, in the case of data, the capsule engine unit 71 performs, in accordance with display order information 7223, displaying in a browsing state prepared by use of a display application such as a web browser or an e-book reader, as shown in step s4 (s4).

In this manner, the capsule engine unit 71 interprets the metadata unit 72 and grasps: whether the device is a personal computer 2*a*, a tablet terminal 2*c*, or a smartphone 2*b*; what the operating system is, and the like. Then, in accordance with the IT environment (information of the device) such as software and communication environment of the information processing device 2, the capsule engine unit 71 obtains the entity of the data which constitutes the content, for example, and determines the program necessary for performing processing, such as displaying, on the data. If the program is not yet installed in the device, the capsule engine unit 71 autonomously collects the program using the server 4 and 5. Alternatively, in the case of a program that realizes the desired function as the content, the capsule engine unit 71 interprets the metadata unit 72, and then obtains the program. Then, in accordance with the IT environment and the like of the device, the capsule engine unit 71 uses programs (such as applications) preinstalled in the device or further obtains necessary programs (such as applications) from outside, and realizes the desired function. As a result, the content can be used in various environments without being conscious of the environment in which the user uses the content, or without installing specific programs (such as applications) in advance. In addition, since the external dictionary server 5 is used, the processing of the metadata unit 72 can be made more efficient.

The capsule 7 of the present invention does not have to obtain both the data and the program (such as applications) from the external server 4, but may obtain at least one of the data and the program. The identification information 7222 is configured as a list of one or a plurality of pieces of identification information (such as URL, URI, and URN).

Hereinafter, provided is a detailed description of the operation of the information processing device 1 on the content creator side, which packages such necessary data or programs into the capsule 7 and delivers or distributes the capsule 7, and the operation of the information processing device 2 which autonomously collects the necessary data or programs by obtaining the capsule 7, to realize the process.

Figure 3:
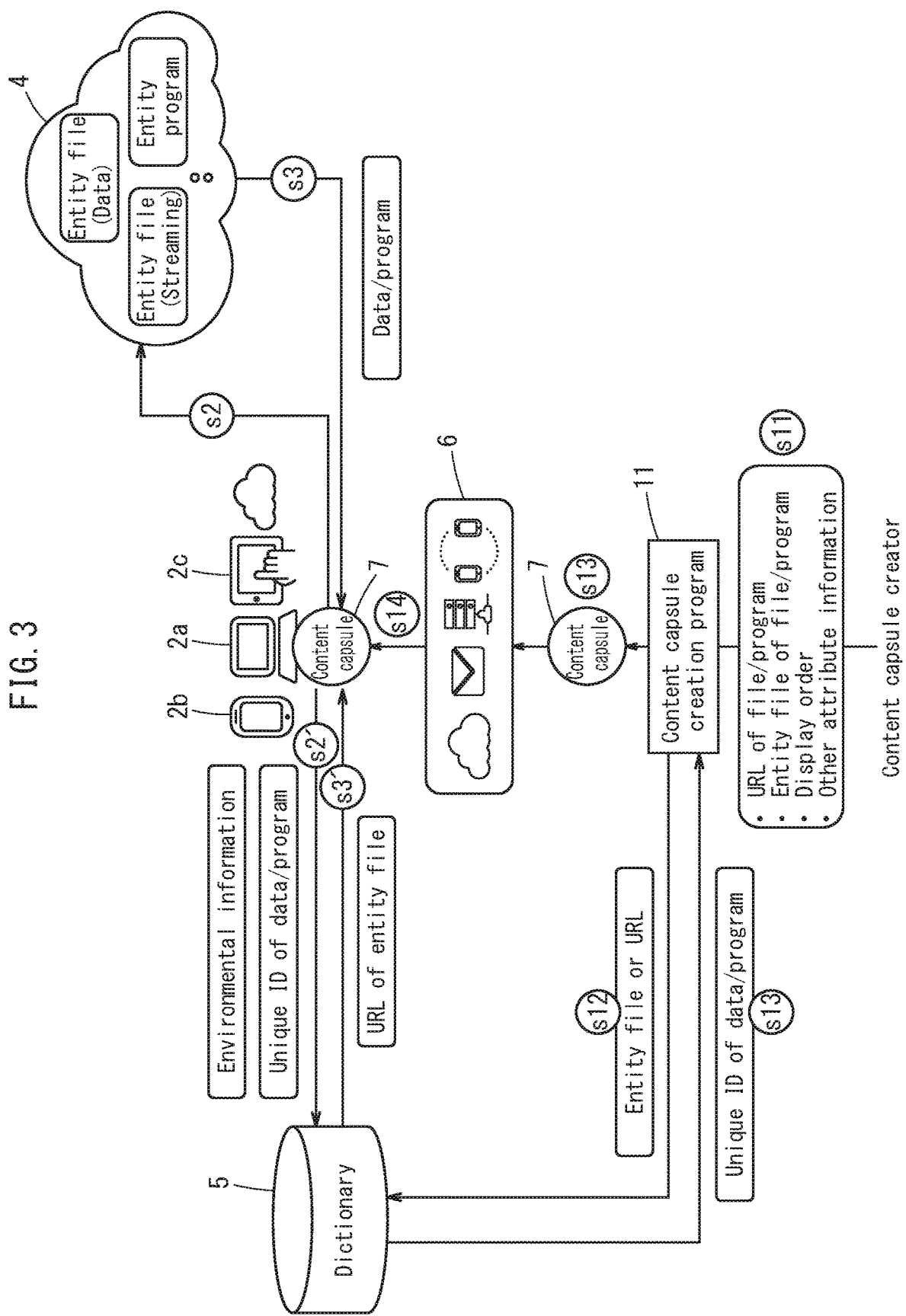
FIG. 3 is a diagram illustrating a procedure of creating a capsule.

FIG. 3 is a diagram illustrating the procedure of creating the content capsule 7. As shown in step s11, the creator registers, into a content capsule creation program 11, the identification information 7222, which includes the identification information (such as URL, URN, and URI) of each data or program to be packaged into the content capsule 7, data to be stored in a data cache unit 73, and data processing information 7223 thereof, and other attribute information 721.

Next, if the creator wishes registration into the dictionary server 5 instead of storing the data or program in the external storage server 4, the content capsule creation program 11 registers the entity of the data or program or the URL thereof into the dictionary server 5 in step s12, and receives a unique ID such as URL, URN, or URI of the registration destination in step s13. In step s14, the content capsule creation program 11 combines the unique ID returned from the dictionary server 5 and the information registered by the creator and creates the content capsule 7. The content capsule 7 created in this manner is delivered and distributed via the SNS (6*a*), the home page (6*c*), the e-mail (6*b*), the communication means (6*d*) between mobile terminals, or the like, and is loaded (installed) into the information processing device 2 on the user side in step s15.

FIG. 4 shows a startup operation in the information processing device 2 on the learner side in which the capsule 7 has been taken in. In step s41, the taken-in capsule 7 accesses the dictionary server 5 on the basis of the identification information 7222 of the metadata unit 72, and transmits the list of unique IDs such as URI and URN of the data or programs, and also the IT environment (device information) such as communication environment and software of the device.

Based on the list that has been sent, the dictionary server 5 sends a reply of a list of locations (URL) of the necessary data or programs in step s42. The information processing device 2 having received this location (URL) list accesses the server 4, which is the external storage corresponding to the location (URL) list in step s43, and receives the entity files and the like in step s44. The information processing device 2 incorporates the received entity files and the like and creates an environment for usage in step s45.

Thereafter, the information processing device 2 sequentially accesses, in step s46, the locations (URL) indicated in the location (URL) list of the data or programs which was originally registered in the identification information 7222 and the locations (URL) indicated in the location (URL) list of the data or programs obtained in steps s41 and s42 as described above, and takes in those functions and content in step s47. The functions and content having been taken in are incorporated into the information processing device 2 in step s48, and an environment in which on-line learning can be used by the information processing device 2 is constructed.

As described above, the content capsule 7 of the present embodiment is circulated in an encapsulated (packaged) form for delivery and distribution. In the content capsule which is taken into and used in the information processing device 2 on the user side, the metadata unit 72 which describes the identification information (such as URL, URN, and URI) 7222 of resource data such as video files, image files, and text files and/or of programs necessary for processing the data is attached; and the capsule engine unit 71 interprets the metadata unit 72, refers to the identification information (such as URL, URN, and URI) 7222, obtains the entity files of the data and/or programs that correspond to the identification information (such as URL, URN, and URI) 7222 by use of the external environment (the servers 4 and 5), and performs processing such as displaying.

That is, the entity of the data or programs as the content is not directly stored in the data cache 73 of the content capsule 7. Instead, the capsule engine unit 71 refers to the identification information (such as URL, URN, and URI) 7222, makes an inquiry to the dictionary server 5 such as a metadata repository when necessary (s2' and s3'), accesses the external environment such as the server 4 which is the external storage on the Internet, and loads the data or programs that correspond to the identification information (such as URL, URN, and URI) 7222 (s2 and s3). Thereafter, the capsule engine unit 71 processes the data or programs as appropriate; assembles data or programs according to, for example, a display method; converts the data or programs into a displayable data format and design in accordance with display processing applications such as web browsers or e-book readers and in accordance with display hardware of the device such as a personal computer or a smartphone; and performs displaying (s4).

Therefore, since the entity of the data or programs is not attached to the content capsule 7, the content capsule 7 including, for example: data or programs that have a relatively large size and thus would have been difficult to be delivered or distributed as is; a plurality of files (data) such as video files, image files, and text files of web pages or the like; or data or programs that are sequentially introduced and updated in association with various needs of users and technological innovation, can be easily delivered or distributed through the web access (6*c*), the e-mail attachment (6*b*), the SNS (6*a*), or direct communication between information processing devices 2. Also, the information processing device 2 on the user side does not become large-scale and thus can deal with various data processing methods (applications and the like).

Particularly, if the content capsule 7 is formatted so as to conform to web standards, it is possible to easily perform primary delivery and distribution of the content, by placing the content capsule 7 directly on a web service or a third-party platform such as SNS or blogs, without having a dedicated system or one's own website. The user who has received the content capsule 7 can also easily perform secondary delivery and distribution to other users. Therefore, in encapsulating the content for circulation, it is possible to realize a decentralized architecture that does not require one's own server, and it is possible to reduce the burden related to system development and operation maintenance.

As described above, each information processing device 2 having received a content capsule 7 from the information processing device 1 or another information processing device 2 is customized in appearance in accordance with the IT environment of the device, capabilities of the device, and the like. The reason why the term "in appearance" is used is because: only the information processing device 2 is customized, and as described later, unless intentional alteration, for example, an addition of a file, is performed on the content capsule 7, the content capsule 7 will keep the same content even if secondary, tertiary, . . . delivery thereof is made. Therefore, desired processing such as displaying can be performed as intended by the content creator.

Since the data cache unit 73 is normally provided in the content capsule 7 as shown in FIG. 2, the entity of a part of data or programs can also be stored in the data cache unit 73. Specifically, the capsule engine unit 71 does not obtain all data or programs from the external environment as described above, but stores at least a part of the data or programs in the capsule 7. For example, when data consists of two content files (content resources), e.g., video and text, the text file is embedded in the capsule 7 itself, i.e., in the data cache unit 73, and the video file is obtained from the web server 4. In the example of FIG. 2, both the video file and the text file are included in the data cache unit 73. Thus, as for the part of the data (content file (content resource)), it is not necessary for the capsule engine unit 71 to obtain the part from the external environment such as the web server 4, and the display processing can be promptly performed.

Likewise, at least a part of the program (application) as the content may be stored in the content capsule 7. This allows the capsule creator (the teacher) to mount, as appropriate, special software and the like that are not open on the Internet, if the capsule creator considers such software as necessary. In the example of FIG. 2, a test function and a live lesson function are mounted as a learning support function in the data cache unit 73.

When the content to be delivered and distributed using the content capsule 7 is a learning material, the teacher, who is the content creator, packages into the content capsule 7 a learning support function such as lecture videos, materials, and/or quizzes, as the content desired to be provided to the learners, who are the users. Then, as described above, the content capsule 7 autonomously obtains necessary data or programs as the content according to each learner's IT environment, thereby being able to provide the learning content as intended by the teacher. Therefore, use of the present system in e-learning enables provision of the e-learning at a low cost, and thus, is extremely preferable. Also, on the learning institution side, since there is no need to prepare a dedicated learning management system or website, the system can fit not only specialized educational institutions such as higher educational institutions but can also be used from corporate training to lifelong learning for the general public, thus expanding the range of the users.

Figure 5A:
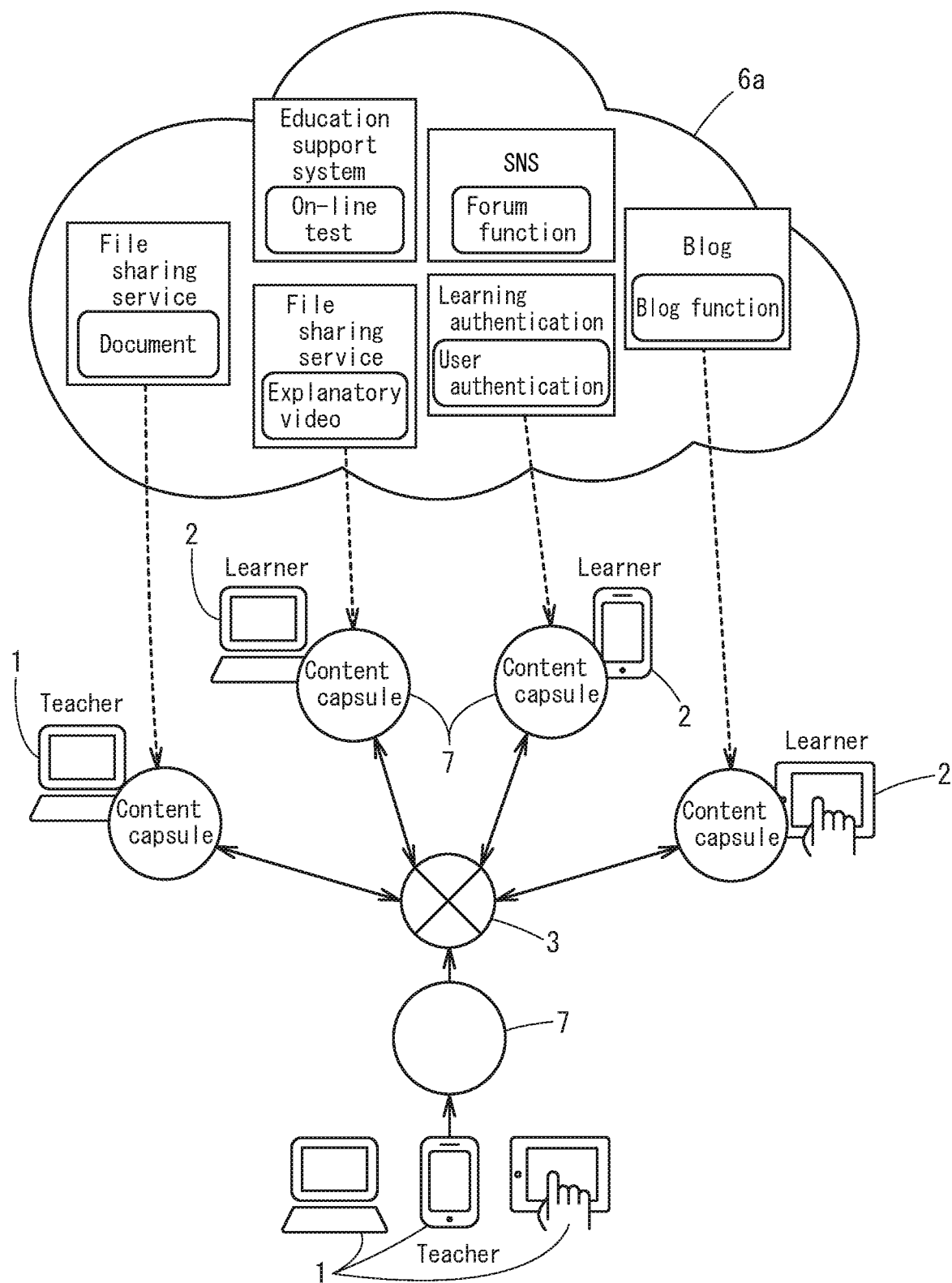
FIG. 5A and FIG. 5B are diagrams explaining the difference in system configurations in e-learning between the content providing system of the present invention and the content providing system of the prior art.
Figure 5B:
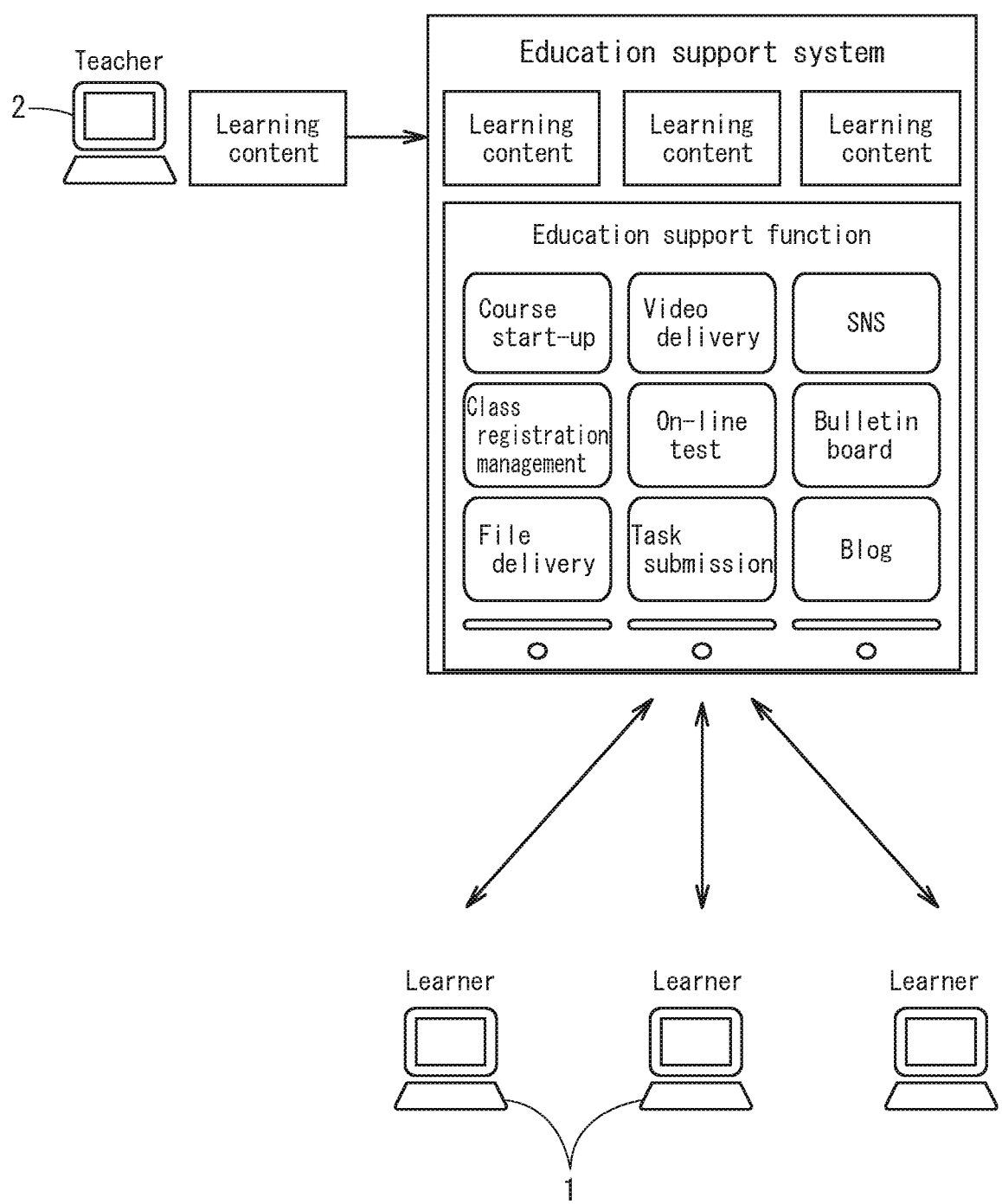

FIG. 5A and FIG. 5B show the difference in system configuration between the present invention and prior art in the e-learning system. Particularly, in the case of the e-learning system, conventionally, as shown in FIG. 5B the system configuration not only has the learning content but also has various functions added in the education support function, resulting in a huge system. FIG. 5B shows some of the principal functions of the education support function, such as an educational course start-up function, a video delivery function, a social network (SNS) function, a class registration management function, an on-line testing function, a bulletin board function, a file delivery function, a task submission function, and a blog function. The class registration management function is, for example, a function of managing which class a learner should take depending on the course and which class the learner has attended. The task submission function is for the submission of reports and the like. Other than this, as learning support functions in the case of the e-learning system, there are functions such as a live lesson function, a badge (certificate) issuance management function, and a TV conference function.

In the conventional e-learning system, at the start-up of the course, the educational institution side designs and produces a system incorporating all such functions considered to be necessary, and verifies the operation and the like, and when there is a demand for modification such as addition of functions, the whole system needs to be reviewed. Furthermore, even when convenient and latest functions exist on the Internet, the teachers, who are content creators, cannot use those functions unless the e-learning system provides the functions. Thus, the teachers are only able to provide on-line education using the functions provided by the e-learning system.

In contrast, in the present invention, as described above, if the teacher merely packages the identification information (such as URL, URN, and URI) of the necessary content data or programs into the content capsule 7, the information processing device 2, which has the content capsule 7 loaded and installed therein, autonomously collects necessary data or programs corresponding to the IT environment of each user from the cloud environment (6a) and the like and customizes the device. Accordingly, each information processing device 2 is set up to be able to perform on-line learning, and is enabled to perform desired processing such as displaying as intended by the teacher, who is the content creator. Furthermore, the configuration of the information processing device 1 for creating and delivering the content capsule 7 and the configuration of the information processing device 2 on the receiving side can be significantly simplified, and introduction, maintenance, and management of the e-learning system can be facilitated. In addition, the teachers, who deliver and distribute the content, can freely combine the convenient and latest functions provided on the Internet, to create the content capsule 7, and easily provide on-line education.

Here, as described above, although the content capsule 7 keeps the same content even when the content capsule 7 is redelivered, the information processing device 2 is customized as appropriate in accordance with the IT environment of the device. The customization may be extended to the content. Specifically, a learning history collection function and a log collection function are embedded in the learning support function of the data cache unit 73. The collected data is stored in a ROM or the like outside the content capsule 7. Then, in the case of the learning history collection function, for example, the information processing device 2 accumulates the learning history of the user, and at a predetermined stage, the capsule engine unit 71 inquires a learning history to the dictionary server 5, such as a metadata repository designated in advance by the teacher. As a result of the inquiry, when the progress of learning is considered as delayed, the information processing device 2 newly obtains, from the external storage server 4, data or programs which are preferable to be obtained additionally, such as follow-up materials and supplementary materials. This makes it possible to distribute the follow-up materials to learners, for example, who cannot pass tests even after taking the course repeatedly, and thus, the learning effects can be enhanced.

Meanwhile, in the case of the log collection function, for example, in the data cache unit 73 of each content capsule 7, a unique ID which is unable to be modified due to encryption or the like, and a function of collecting logs of content (data (files)) displays are embedded. Through the log collection function, even in the case of a content capsule that has been redelivered or re-redelivered from an arbitrary user or the like, if the ID is the same, the logs gather to the information processing device 1 of the teacher, who is the delivery source, and data as to when and how much the content (data (files)) has been subjected to predetermined processing such as displaying is collected. This makes it possible to collectively obtain the usage history such as browsing of the content capsule 7 that has been provided in a distributed manner, duplicated, and redistributed as described above. Therefore, on the part of teachers and educational institutions, who are content creators, it is possible to appropriately improve the content to be provided.

The present invention is one means for realizing a distributed web architecture, and in order to change the web architecture based on a server-client method, which has been commonly employed in web services, the content capsule 7 which assembles various contents stored in the external storages (4, 5) on the Internet and which autonomously constructs an on-line learning environment and the like is used. This is realized because, although the content capsule 7 of the present invention seems to be a single file or program with a small size from the user's viewpoint, the inside of the content capsule 7 has a structure mainly including the metadata unit 72 and the capsule engine unit 71, without storing a part or all of the entity of the file or program. Specifically, the identification information 7222 such as URL, URN, and URI, unique to the content is described in the metadata unit 72, and when the user takes the content capsule 7 into the user's own information processing device 2, the capsule engine unit 71 obtains necessary files or programs from the external storage (4, 5) and the like in accordance with the identification information 7222 of the metadata unit 72, and autonomously constructs an on-line learning environment and the like. Accordingly, the teachers and the like can arrange the content capsule 7 in various websites such as SNS, thereby providing on-line learning or the like with a decentralized architecture that does not require a specific server.

Embodiment 2

Figure 6:
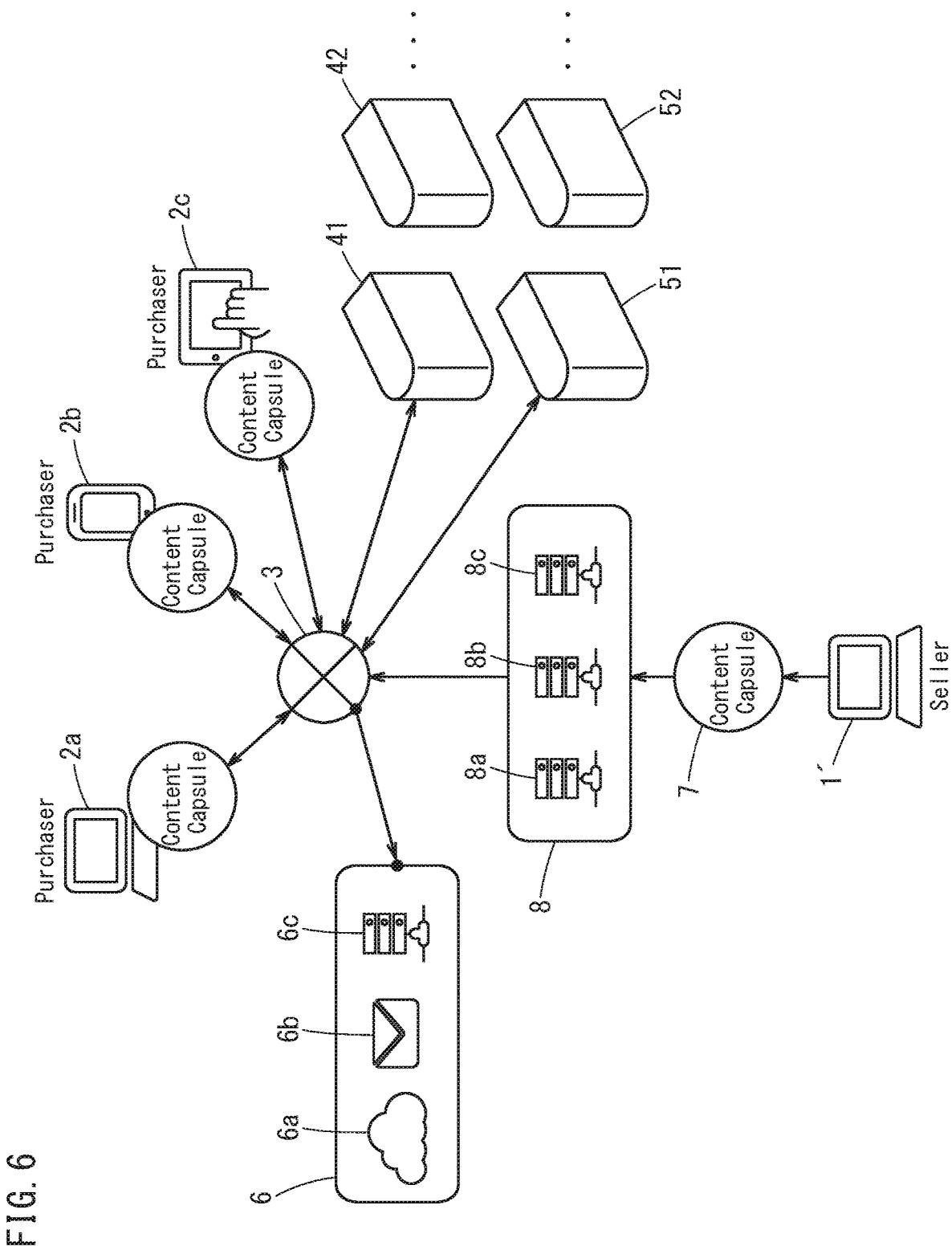
FIG. 6 is a block diagram showing a configuration of a content providing system according to another embodiment of the present invention.

FIG. 6 is a block diagram showing a configuration of a content providing system to which a content encapsulation structure according to another embodiment of the present invention is applied. This embodiment is applied to an e-commerce system. In FIG. 6, parts that are similar to or correspond to those in the e-learning system in FIG. 1 are denoted by the same reference numerals as those used in FIG. 1, and description thereof is omitted. Also in the present invention, as described above, in accordance with the identification information (such as URL, URN, and URI) described in the identification information 7222 of the metadata unit 72, the content capsule 7 autonomously obtains, as the content, necessary data or programs (applications) adapted to the IT environment of each user, and performs processing as intended by the content creator.

As a result, on the content delivery side, that is, the seller side, it is possible to easily introduce the e-commerce system at a low cost. Also, the user does not have to prepare a particular IT environment in advance for the e-commerce system. Further, on the content delivery (seller) side, replacement to new products is enabled simply by modifying the identification information (such as URL, URN, and URI) 7222. Also, even in the case of an identical product, a new data processing method (application, that is, display method) can be applied simply by modifying the identification information (such as URL, URN, and URI) 7222. For example, if the same item is set separately into a plurality of content capsules 7, for example, in the case of travel products/services, if choices such as means for transportation to the sites, accommodation facilities, meals, rental cars, and other options can be arbitrarily combined, package products can be provided.

Further, according to the present invention, as described above, the capsule 7 can be delivered using an arbitrary platform, such as a third-party platform or SNS, where users have already gathered. Thus, in the case of the above-described e-learning system, the information processing device 1 for creators such as teachers and schools serves as a direct delivery source of the content capsule 7 in many cases. However, it should be noted that, in the case of the e-commerce system of the present embodiment, the third-party platform 8 is used as the information processing device for delivery.

In FIG. 6, an information processing device 1' on the content provider side is owned by a seller or the like, and the information processing device 1' mainly creates the content capsule 7, and the content capsule 7 is delivered mainly through home pages 8a, 8b, 8c on the third-party platform 8. Therefore, the seller uploads (places and/or registers) the content capsule 7 created by the information processing device 1' for the creator to the third-party platform 8 serving as the information processing device for delivery. The information processing device 2 is used by the purchaser or the viewer.

Portal pages and the like of famous sites can be used as the home pages 8a, 8b, 8c, and the pages can be classified, for example, such that: the home page 8a is for businesspersons, the home page 8b is for children, and the home page 8c is for young people. Therefore, selection among the home pages 8a, 8b, 8c also enables the target purchaser group to be changed. Thus, not only introduction but also maintenance and management of the e-commerce system can be carried out at a low cost, and very high expansivity can be realized.

Here, in Japanese Unexamined Patent Application Publication No. 2011-70644, a device (assembly service architecture) is described that adds API information and user interface information in the same format to a plurality of resources scattered in the network to form a capsule called "Magicell" and allows mash-up (into a large capsule) according to the logical relationship of the plurality of resources, thereby enabling existing resources to be efficiently combined and circulated as new web resources. That is, the technique of encapsulation is described in detail.

However, according to this conventional technique, it is necessary to write the code from scratch. That is, in this conventional technique, it is necessary to recognize not only the codes of additional combinations, but also the codes of the respective resources before combination. When compared with prior art before this conventional technique, the burden of encoding is reduced, but still, the developer needs to develop combinatorial logic codes, unlike the present invention in which encapsulation is performed with a simple operation (no code recognition) such as simply sequentially designating data or programs as the content including the order. Also, in this conventional technique, the capsule is not intended for distribution and delivery of the content, and unlike the present invention, the user who wishes to distribute the content cannot easily encapsulate the content using personal computers or mobile terminals, and cannot place the capsule to an arbitrary web server to provide the capsule to users. Also, in this conventional technique, there is no concept of allowing dynamic evolvement according to the environment or level of users (in the case of learning, the state of progress of the curriculum and the like).

In addition, Japanese Unexamined Patent Application Publication No. 2007-41702 proposes a method, for an encapsulated document, which encapsulates a web server function and content, thereby easily delivering the content.

However, this conventional technique only interprets commands from web browsers to transmit corresponding files, and thus, cannot take in various latest services on the web.

A content encapsulation structure of the present invention is a structure for encapsulating content into a capsule for circulation, and the content encapsulation structure includes: a metadata unit including one or a plurality of metadata in which identification information (such as URL and URN) for referring to an external storage and unique to data constituting the content and processing information (such as a data processing method or a display method) necessary for processing the data are described; and a capsule engine unit configured to refer to the identification information (such as URL and URN), obtain data corresponding to the identification information (such as URL and URN) from the external storage, hand over the data to a processing program (library of OS, JAVA (registered trade mark), or the like), a conversion program such as an encoder, a display program such as a web browser or an e-book reader, or the like) installed in advance in a device, and cause the data to be processed in accordance with the processing information (such as a data processing method or a display method).

A content provision method of the present invention is a method for encapsulating content into a capsule and providing the encapsulated content to a user. The capsule includes: a capsule engine unit configured to perform a process on data that constitutes content; and a metadata unit including one or a plurality of metadata in which identification information (such as URL and URN) for referring to an external storage and unique to data of the content and processing information (such as a data processing method or a display order) necessary for processing the data are described. The content provision method includes: a step of obtaining the capsule from a creator information processing device on a content creator side performed by an information processing device on a user side; a step of referring to the identification information (such as URL and URN) and obtaining data corresponding to the identification information (such as URL and URN) from the external storage performed by the capsule engine unit activated in the information processing device on the user side; and a step of processing the obtained data on the basis of the processing information (such as a data processing method or a display order) performed by the capsule engine unit activated in the information processing device on the user side.

According to the configuration described above, a structure for encapsulating (packaging) content for delivery and distribution and circulating the encapsulated content is provided. When the data constituting the content is static data, such as video files, image files, and text files, the data usually has attached thereto a metadata unit including one or a plurality of metadata in which unique attribute information (file creator name, creation date and time) and processing information (such as a data processing method or a display method) necessary for enabling use of the data are described. In the present invention, identification information (such as URL and URN) for referring to an external storage is added to the metadata unit so that: the capsule engine unit refers to the identification information (such as URL and URN); loads data (such as entity files) constituting the content that corresponds to the identification information (such as URL and URN), from the external storage; hands over the data to a processing program, e.g., a library of OS, JAVA (registered trade mark), or the like, a conversion program such as an encoder, or a web browser or an e-book reader; and causes the data to be processed in accordance with the processing information (such as a data processing method or a display method).

In other words, data of the content having a large size (such as entity files) is not directly stored in the capsule, but the capsule engine unit refers to the identification information (such as URL and URN), accesses an external storage such as a material server or a web server on the network, and loads the data (entity files) of the corresponding content into the information processing device on the user side (the device). Then, in accordance with the processing information (a data processing method or a display method) described in the metadata unit, the capsule engine unit assembles or converts the data (entity files) to process the data; further, converts the data format and the design in accordance with processing applications such as a library of OS, JAVA (registered trade mark), or the like, a conversion program such as an encoder, or a web browser or an e-book reader installed in advance in the device, and in accordance with the hardware of the device such as a personal computer or a smartphone; and completes the processing such as displaying.

Therefore, data (such as entity files) constituting the content is not attached to the capsule, and a plurality of contents are allowed to be compiled. Thus, for example, content having a relatively large size as is, content (such as weather information or stock prices) sequentially updated, or a document composed of a plurality of contents such as video files, image files, and text files can be easily delivered or distributed in a single capsule of a small size, through websites, e-mail attachments, or storage media such as USB flash memories.

Particularly, if the capsule is formatted so as to conform to web standards, it is possible to realize a decentralized architecture that enables easy delivery and distribution of the capsule, by placing the capsule directly on a web service or a third-party platform such as SNS or blogs, without having a dedicated system or one's own website. In addition, in encapsulating the content for circulation, it is possible to reduce the burden related to system development and operation maintenance.

Moreover, the content encapsulation structure of the present invention is a structure for encapsulating content into a capsule for circulation, and the content encapsulation structure includes: a metadata unit in which one or a plurality of pieces of identification information (such as URL and URN) respectively unique to one or a plurality of programs are described, each program including scripts and/or codes and being necessary for performing a predetermined process on data constituting the content; and a capsule engine unit configured to refer to each piece of identification information (such as URL and URN), obtain a program corresponding to the identification information (such as URL and URN) from an external storage, hand over the data to the program, and perform the predetermined process on the data by causing, as appropriate, the program to operate in cooperation with another program preinstalled in a device.

A content provision method of the present invention is a method for encapsulating content into a capsule and providing the encapsulated content to a user. The capsule includes a capsule engine unit configured to perform a process on data constituting the content, and a metadata unit in which one or a plurality of pieces of identification information (such as URL and URN) respectively unique to one or a plurality of programs are described, each program including scripts and/or codes and being necessary for performing a predetermined process on the data. The content provision method includes: a step of obtaining the capsule from a creator information processing device on a content creator side performed by an information processing device on a user side; a step of referring to each piece of identification information (such as URL and URN) and obtaining a program corresponding to the identification information (such as URL and URN) from an external storage performed by the capsule engine unit activated in the information processing device on the user side; and a step of handing over the data to the obtained program and performing the predetermined process on the data by causing, as appropriate, the program to operate in cooperation with another program preinstalled in the information processing device on the user side performed by the capsule engine unit activated in the information processing device on the user side.

According to the configuration described above, a structure for encapsulating (packaging) content for delivery and distribution and circulating the encapsulated content is provided. A metadata unit describing attribute information such as the file name or the creator name of the content is attached to the data constituting the content such as video files, image files, and text files. In the present invention, identification information (URL, URN), which is unique to one or a plurality of scripts and codes or programs necessary for performing a predetermined process, such as displaying, on the content data, and the display order or the like if necessary are described in the metadata unit. Then, the capsule engine unit which performs the predetermined process interprets the metadata unit. Then, on the basis of the IT environment (device information) such as communication environment and software of the information processing device, e.g., whether the device is a personal computer, a tablet terminal, or a smartphone, and further, what the operating system is, the capsule engine unit autonomously collects one or a plurality of programs necessary for performing displaying of the data and the like, and performs the display process.

That is, the capsule engine unit refers to the identification information (such as URL and URN) of the metadata unit, determines a program (such as scripts and codes, or an application) necessary for processing the data. If the program is not installed in the information processing device on the user side, the capsule engine unit obtains, from an external storage such as a cloud, the program corresponding to the identification information (such as URL and URN), e.g., a program such as video playing software or e-book browsing software. Then, by causing, as appropriate, the program to operate in cooperation with another program such as a web browser of the device, which is preinstalled in the device, the capsule engine unit performs a predetermined process such as displaying.

Therefore, even if the program necessary for data processing, such as content data display, is not installed in the information processing device on the user side, and even if such a program is not attached to the capsule, the capsule engine unit obtains the program and performs the predetermined process such as displaying. Thus, the information processing device on the user side does not become large-scale and can cope with various programs.

Accordingly, on the delivery and distribution side of the content, the degree of freedom of programs to be used in processing the content data is improved, and latest programs can be used. In addition, since the capsule does not become large-sized, delivery and distribution thereof can be easily performed through websites, e-mail attachments, or storage media such as USB flash memories.

Particularly, if the capsule is formatted so as to conform to web standards, it is possible to realize a decentralized architecture which enables easy delivery and distribution of the capsule, by placing the capsule directly on a web service or a third-party platform such as SNS or blogs or by sharing the web service or platform with a third-party, without having a dedicated system or one's own website. In addition, in encapsulating the content for circulation, it is possible to reduce the burden related to system development and operation maintenance.

Furthermore, a content encapsulation structure of the present invention is a structure for encapsulating content into a capsule for circulation, and the content encapsulation structure includes: a metadata unit in which one or a plurality of pieces of identification information (such as URL and URN) respectively unique to one or a plurality of programs are described, each program including scripts and/or codes, constituting the content, and realizing a desired function; and a capsule engine unit configured to refer to each piece of identification information (such as URL and URN), obtain a program corresponding to the identification information (such as URL and URN) from an external storage, and cause the desired function to be realized by causing, as appropriate, the program to operate in cooperation with another program preinstalled in a device.

A content provision method of the present invention is a method for encapsulating content into a capsule and providing the encapsulated content to a user. The capsule includes a capsule engine unit configured to cause a desired function to be realized, and a metadata unit in which one or a plurality of pieces of identification information (such as URL and URN) respectively unique to one or a plurality of programs are described, each program realizing the desired function. The content provision method includes: a step of obtaining the capsule from a delivery server on a content creator side performed by an information processing device on a user side; a step of referring to each piece of identification information (such as URL and URN) and obtaining a program corresponding to the identification information (such as URL and URN) from an external storage performed by the capsule engine unit activated in the information processing device on the user side; and a step of realizing the desired function by causing, as appropriate, the obtained program to operate in cooperation with another program preinstalled in the information processing device on the user side performed by the capsule engine unit activated in the information processing device on the user side.

According to the configuration described above, a structure for encapsulating (packaging) content for delivery and distribution and circulating the encapsulated content is provided. As the content, in the present invention, unique identification information (such as URL and URN) is added to one or a plurality of dynamic programs for realizing a desired function, for example, programs including script and codes, such as live broadcasting, TV conference, chat function, and billing function, and the identification information (such as URL and URN) is described in the metadata unit of the capsule. Then, the capsule engine unit which performs the process required by the capsule of the content interprets the metadata unit. Then, on the basis of the IT environment (device information) such as communication environment and software of the information processing device, e.g., whether the device is a personal computer, a tablet terminal, or a smartphone, and further, what the operating system is, the capsule engine unit autonomously collects programs that can realize the desired function.

That is, the capsule engine unit refers to the identification information (such as URL and URN) of the metadata unit and determines a program (such as scripts and codes, or an application) necessary for realizing the desired function. If the program is not installed in the information processing device on the user side, the capsule engine unit obtains the program corresponding to the identification information (such as URL and URN) from an external storage such as a cloud and realizes the desired function by causing, as appropriate, the program to operate in cooperation with another program such as a web browser preinstalled in the device.

Therefore, even if the program necessary for realizing the desired function is not installed in the information processing device on the user side, and even if the entity of such a program is not attached to the capsule, the capsule engine unit obtains the program and realizes the desired function. Thus, the information processing device on the user side does not become large-scale, and can cope with various programs (such as applications).

Accordingly, on the delivery and distribution side of the program content, it is possible to deliver and distribute arbitrary programs irrespective of, for example, the sizes of the programs, and also it is possible to deliver and distribute latest programs. Furthermore, by describing a plurality of pieces of identification information (such as URL and URN), it is also possible to flexibly combine a plurality of programs, and realize various functions. In addition, since the capsule does not become large-sized, delivery and distribution thereof can be easily performed through websites, e-mail attachments, or storage media such as USB flash memories.

Particularly, if the capsule is formatted so as to conform to web standards, it is possible to realize a decentralized architecture that enables easy delivery and distribution of the capsule, by placing the capsule directly on a web service or a third-party platform such as SNS or blogs or by sharing the web service or platform with a third-party, without having a dedicated system or one's own website. In addition, in encapsulating the content for circulation, it is possible to reduce the burden related to system development and operation maintenance.

Still further, the content encapsulation structure of the present invention further includes a data cache unit, wherein the data cache unit stores at least a part of the content.

According to the configuration described above, the capsule engine unit does not obtain all of the data or programs (such as scripts, codes, or applications) constituting the content from an external storage, but stores at least a part thereof in the capsule. For example, when content data consists of two files, e.g., video and text, the text file is embedded in the capsule, and the video file is obtained from the web or the like as described above.

Therefore, regarding the part of the content, it is not necessary for the capsule engine unit to obtain the part from an external storage such as a cloud, and the desired function can be promptly performed by data processing, such as displaying, and programs (such as applications).

In the content encapsulation structure of the present invention, the data of the content is a learning material.

According to the configuration described above, the teacher, who is the content creator, packages, into the capsule, identification information (URL, URN) of static content such as lecture videos and materials desired to be provided to the learner, who is the user, so that the capsule autonomously obtains data of necessary content as described above and can provide the learning material as intended by the teacher. Thus, there is no need to prepare a dedicated learning management system or website, and e-learning can be provided at a low cost. Particularly, in the case of providing e-learning, conventionally, it was necessary to prepare a delivery server storing all the necessary learning materials, whereas in the present invention, as described above, if the identification information (URL, URN) is merely packaged into the capsule, the capsule autonomously collects the necessary content (learning materials), and thus, there is no need for a delivery server. This leads to cost reduction in e-learning implementation and makes it possible to quickly provide, at a low cost, e-learning from specialized educational institutions such as higher educational institutions, to cram schools, preparatory schools, private companies, and individuals. Therefore, e-learning can be spread and the range of the users of the e-learning can be expanded.

Further, in the content encapsulation structure of the present invention, the program of the content is a learning support function program.

According to the configuration described above, if the teacher, who is the content creator, packages, into the capsule, identification information (URL, URN) of dynamic content such as live lessons and TV conferences desired to be provided to the learner, who is the user, the capsule autonomously obtains the necessary learning support function program as described above and can provide the learning content as intended by the teacher. Thus, there is no need to prepare a dedicated learning management system or website, and e-learning can be provided at a low cost. Particularly, in the case of providing e-learning, conventionally, it was necessary to prepare a delivery server storing various learning support functions, whereas in the present invention, as described above, if the identification information (URL, URN) is merely packaged into the capsule, the capsule autonomously collects the necessary program (learning support function), and thus, there is no need for a delivery server. This leads to cost reduction for e-learning implementation and makes it possible to quickly provide, at a low cost, e-learning from specialized educational institutions such as higher educational institutions, to cram schools, preparatory schools, private companies, and individuals. Therefore, e-learning can be spread and the range of the users of the e-learning can be expanded.

In the content encapsulation structure of the present invention, the data of the content is a material related to a product to be sold.

According to the configuration described above, the capsule autonomously obtains the data of the necessary content, the process as intended by the content creator is performed, and the capsule can be delivered on an arbitrary website, such as SNS, where users have already gathered. Therefore, it is possible to easily introduce the e-commerce system at a low cost without gathering users to a dedicated website of the content delivery (seller) side. Also, on the content delivery (seller) side, replacing old products with new products can be realized by merely changing the identification information (such as URL and URN). Also, merely by changing the website where the capsule is delivered, it is possible to change the target customer group. Therefore, not only introduction but also maintenance and management of the e-commerce system can be carried out at a low cost, and further, new customers can be developed.

Furthermore, a content providing system of the present invention includes: a creator information processing device configured to create the capsule; an information processing device used by a user and configured to obtain the capsule;

an external storage storing in advance data of desired content; a data dictionary configured to, in response to an inquiry about the identification information (such as URL and URN) from the information processing device, answer a location in the external storage storing the data of the content corresponding to the identification information (such as URL and URN); and a network which mutually connects the creator information processing device, the information processing device, the external storage, and the data dictionary. The information processing device accesses the location in the external storage in accordance with the answer from the data dictionary, thereby obtaining the data of the content of the capsule obtained from the creator information processing device, and processes the data.

According to the configuration described above, the data dictionary, which is realized by a metadata repository or the like and which rereads the identification information described in the metadata unit of the capsule, is provided, and thus, not only URL which allows direct access to the external storage but also URI, URN, and the like can be used as the identification information, and thus, the convenience is enhanced.

Also, a content providing system of the present invention includes: a creator information processing device configured to create the capsule; an information processing device used by the user and configured to obtain the capsule; an external storage storing in advance a program of the content for realizing the desired function; a data dictionary configured to, in response to an inquiry about the identification information (such as URL and URN) from the information processing device, answer a location in the external storage storing the program of the content corresponding to the identification information (such as URL and URN); and a network which mutually connects the creator information processing device, the information processing device, the external storage, and the data dictionary. The information processing device accesses the location in the external storage in accordance with the answer from the data dictionary, thereby obtaining program data of the content of the capsule obtained from the creator information processing device, and realizes the desired function.

According to the configuration described above, the data dictionary, which is realized by a metadata repository or the like and which rereads the identification information described in the metadata unit of the capsule, is provided, and thus, not only URL which allows direct access to the external storage but also URI, URN, and the like can be used as the identification information, and thus, the convenience is enhanced.

Furthermore, the content providing system of the present invention further includes a delivery information processing device configured to receive the capsule created by the creator information processing device, and configured to allow browsing of the capsule by the information processing device on the user side and deliver the capsule to the information processing device on the user side.

According to the configuration described above, in the present invention, as described above, since the capsule can be delivered to an arbitrary platform, such as a third-party platform or SNS, where users have already gathered, a dedicated delivery information processing device that receives the capsule created by the creator information processing device, that allows browsing of the capsule by the information processing device on the user side, and that delivers the capsule is provided.

Therefore, it is possible to use portal pages and the like of famous sites, to easily expand the number of users, and also to change the target user group by, for example, selecting an arbitrary home page as the third-party platform. Thus, this configuration is advantageous particularly for e-commerce systems.

Further, in the content providing system of the present invention, the information processing device redelivers or redistributes the obtained capsule to another information processing device, via the network, direct communication between information processing devices, or a storage medium.

According to the above configuration, in the present invention, as described above, there is no need for particular servers for the creation and delivery of the capsule. Therefore, the information processing device of the user having obtained the capsule can serve, in turn, as a redelivery source information processing device, and redeliver the capsule to an acquaintance or the like via the network. Alternatively, the user can serve as a redistribution source, and redistribute the capsule via direct communication between information processing devices such as peer-to-peer communications, or via a storage medium such as a USB memory.

In addition, in the present invention, even if the capsule is redelivered or redistributed in this manner, the capsule is not affected by the function of the information processing device that has performed the redelivery or redistribution, and the capsule can be customized as described above and constantly perform the processing as intended by the content creator.

Still further, in the content provision method of the present invention, each capsule has embedded therein a unique ID that is unable to be modified and a function that records transfer of the capsule, and the information processing device redelivers or redistributes, to another information processing device, the obtained capsule that has been delivered via a network or that has been distributed via direct communication between information processing devices or via a storage medium.

According to the configuration described above, in the present invention, data and functions can be packaged in the capsule as described above. Therefore, by embedding, for each capsule, the unique ID which is unable to be modified due to encryption or the like, and the function that records transfer of the capsule, it is possible to collectively obtain the usage history, such as browsing of the content which has been provided in a distributed manner, duplicated, and redistributed as described above.

INDUSTRIAL APPLICABILITY

According to the content encapsulation structure, and the content provision method and the system using the same according to the present invention, in encapsulating the content to enable delivery and distribution thereof, identification information (such as URL and URN) unique to the content such as files or programs are added; the identification information is stored in the metadata unit; and the capsule engine unit refers to the identification information, obtains at least a part of entity of files or programs of the content corresponding to the identification information from an external storage, and performs a predetermined process.

Therefore, it is not necessary to store all the entity of files or programs within the capsule, and thus, the present invention is preferable in distribution and delivery of content, particularly in on-line education and e-commerce.

What is claimed is:
1. A content encapsulation structure for encapsulating content into a capsule for circulation by a first information processing device to a second information processing device, the capsule comprising:
- a metadata unit that describes information regarding the capsule, wherein the metadata unit includes an attribute information and a structure information, wherein the attribute information indicates one or more characteristics of the content, and wherein the structure information includes one or a plurality of metadata in which identification information for referring to an external storage and unique to data constituting the content and processing information necessary for processing the data are described; and
- a capsule engine unit configured to refer to the identification information, obtain data corresponding to the identification information from the external storage, hand over the data to a processing program installed in advance in the second information processing device, and cause the data to be processed in accordance with the processing information.

2. A content encapsulation structure for encapsulating content into a capsule by a first information processing device used to a second information processing device for circulation, the capsule comprising:
- a metadata unit that describes information regarding the capsule, wherein the metadata unit includes an attribute information and a structure information, wherein the attribute information indicates one or more characteristics of the content, and where the structure information includes one or a plurality of pieces of identification information respectively unique to one or a plurality of programs are described, each program including scripts and/or codes and being necessary for performing a predetermined process on data constituting the content; and
- a capsule engine unit configured to refer to each piece of identification information, obtain a program corresponding to the identification information from an external storage, hand over the data to the program, and perform the predetermined process on the data by causing the program to operate in cooperation with another program preinstalled in the second information processing device.

3. A content encapsulation structure for encapsulating content into a capsule in a first information processing device for circulation to a second information processing device, the capsule comprising:
- a metadata unit that describes information regarding the capsule, wherein the metadata unit includes an attribute information and a structure information, wherein the attribute information indicates one or more characteristics of the content, and wherein the structure information includes one or a plurality of pieces of identification information respectively unique to one or a plurality of programs are described, each program including scripts and/or codes, constituting the content, and realizing a desired function; and
- a capsule engine unit configured to refer to each piece of identification information, obtain a program corresponding to the identification information from an external storage, and cause the desired function to be realized by causing the program to operate in cooperation with another program preinstalled in the second information processing device.

4. The content encapsulation structure according to claim 1, further comprising a data cache unit, wherein the data cache unit stores at least a part of the content.

5. The content encapsulation structure according to claim 2, further comprising a data cache unit, wherein the data cache unit stores at least a part of the content.

6. The content encapsulation structure according to claim 3, further comprising a data cache unit, wherein the data cache unit stores at least a part of the content.

7. The content encapsulation structure according to claim 1, wherein the data of the content is a learning material.

8. The content encapsulation structure according to claim 2, wherein the program of the content is a learning support function program.

9. The content encapsulation structure according to claim 1, wherein the data of the content is a material related to a product to be sold.

10. A content providing system comprising:
- a creator information processing device configured to create the capsule according to claim 1, wherein the creator information processing device is the first information processing device;
- a second information processing device used by a user and configured to obtain the capsule created by the creator information processing device;
- an external storage storing in advance data of desired content;
- a data dictionary configured to, in response to an inquiry about the identification information from the second information processing device, answer a location in the external storage storing the data of the content corresponding to the identification information; and
- a network which mutually connects the creator information processing device, the second information processing device, the external storage, and the data dictionary, wherein
the second information processing device accesses the location in the external storage in accordance with the answer from the data dictionary, thereby obtaining the data of the content of the capsule obtained from the creator information processing device, and processes the data.

11. A content providing system comprising:
- a creator information processing device configured to create the capsule according to claim 2, wherein the creator information processing device is the first information processing device;
- a second information processing device used by the user and configured to obtain the capsule created by the creator information processing device;
- an external storage storing in advance a program of the content for realizing the desired function;
- a data dictionary configured to, in response to an inquiry about the identification information from the second information processing device, answer a location in the external storage storing the program of the content corresponding to the identification information; and
- a network which mutually connects the creator information processing device, the second information processing device, the external storage, and the data dictionary, wherein
the second information processing device accesses the location in the external storage in accordance with the answer from the data dictionary, thereby obtaining program data of the content of the capsule obtained from the creator information processing device, and realizes the desired function.

12. A content providing system comprising:
a creator information processing device configured to create the capsule according to claim 3, wherein the creator information processing device is the first information processing device;
a second information processing device used by the user and configured to obtain the capsule created by the creator information processing device;
an external storage storing in advance a program of the content for realizing the desired function;
a data dictionary configured to, in response to an inquiry about the identification information from the second information processing device, answer a location in the external storage storing the program of the content corresponding to the identification information; and
a network which mutually connects the creator information processing device, the second information processing device, the external storage, and the data dictionary, wherein
the second information processing device accesses the location in the external storage in accordance with the answer from the data dictionary, thereby obtaining program data of the content of the capsule obtained from the creator information processing device, and realizes the desired function.

13. The content providing system according to claim 10, further comprising:
wherein the second information processing device is a delivery information processing device configured to receive the capsule created by the creator information processing device, and configured to allow browsing of the capsule by the second information processing device on the user side and deliver the capsule to the second information processing device on the user side.

14. The content providing system according to claim 10, wherein
the second information processing device redelivers or redistributes the obtained capsule to another information processing device, via the network, direct communication between information processing devices, or a storage medium.

15. A content provision method for encapsulating content into a capsule at a first information processing device and providing the encapsulated content a user of a second information processing device,
the capsule including
a capsule engine unit configured to perform a process on data that constitutes content, and
a metadata unit that describes information regarding the capsule, wherein the metadata unit includes an attribute information and a structure information, wherein the attribute information indicates one or more characteristics of the content, and wherein the structure information includes one or a plurality of metadata in which identification information for referring to an external storage and unique to data of the content and processing information necessary for processing the data are described,
the content provision method comprising:
a step of obtaining the capsule from the first information processing device on a content creator side performed by the second information processing device on a user side;
a step of referring to the identification information and obtaining data corresponding to the identification information from the external storage performed by the capsule engine unit activated in the second information processing device on the user side; and
a step of processing the obtained data on the basis of the processing information performed by the capsule engine unit activated in the second information processing device on the user side; and
a step of handing over, by the capsule engine unit, the obtained data processed by the processing information to a program that is already installed in the second information processing device.

16. A content provision method for encapsulating content into a capsule by a first information processing device and providing the capsule to a second information processing device used by a user,
the capsule including
a capsule engine unit configured to perform a process on data constituting the content, and
a metadata unit that describes information regarding the capsule, wherein the metadata unit includes an attribute information and a structure information, wherein the attribute information indicates one or more characteristics of the content, and wherein the structure information includes one or a plurality of pieces of identification information respectively unique to one or a plurality of programs are described, each program including scripts and/or codes and being necessary for performing a predetermined process on the data,
the content provision method comprising:
a step of obtaining the capsule from the first information processing device on a content creator side performed by the second information processing device on a user side;
a step of referring to each piece of identification information and obtaining a program corresponding to the identification information from an external storage performed by the capsule engine unit activated in the second information processing device on the user side; and
a step of performing the predetermined processing on the data by causing the program to operate in cooperation with another program preinstalled in the second information processing device on the user side performed by the capsule engine unit activated in the second information processing device on the user side.

17. A content provision method for encapsulating content into a capsule by a first information processing device and providing the encapsulated content to a second information processing device used by a user,
the capsule including
a capsule engine unit configured to cause a desired function to be realized, and
a metadata unit that describes information regarding the capsule, wherein the metadata unit includes an attribute information and a structure information, wherein the attribute information indicates one or more characteristics of the content, and wherein the structure information includes one or a plurality of pieces of identification information respectively unique to one or a plurality of programs are described, each program realizing the desired function,
the content provision method comprising:
a step of creating a capsule by a first information processing device;

a step of obtaining the capsule from the first information processing device on a content creator side performed by the second information processing device on a user side;

a step of referring to each piece of identification information and obtaining a program corresponding to the identification information from an external storage performed by the capsule engine unit activated in the second information processing device on the user side; and a step of realizing the desired function by causing the obtained program to operate in cooperation with another program preinstalled in the second information processing device on the user side performed by the capsule engine unit activated in the second information processing device on the user side.

18. The content provision method according to claim 15, wherein each capsule has embedded therein a unique ID that is unable to be modified and a function that records transfer of the capsule, and the second information processing device redelivers or redistributes, to another information processing device, the obtained capsule that has been delivered via a network or that has been distributed via direct communication between information processing devices or via a storage medium.

19. The content provision method according to claim 16, wherein each capsule has embedded therein a unique ID that is unable to be modified and a function that records transfer of the capsule, and the second information processing device redelivers or redistributes, to another information processing device, the obtained capsule that has been delivered via a network or that has been distributed via direct communication between information processing devices or via a storage medium.

20. The content provision method according to claim 17, wherein each capsule has embedded therein a unique ID that is unable to be modified and a function that records transfer of the capsule, and the second information processing device redelivers or redistributes, to another information processing device, the obtained capsule that has been delivered via a network or that has been distributed via direct communication between information processing devices or via a storage medium.

* * * * *